United States Patent Office 3,151,750
Patented Oct. 6, 1964

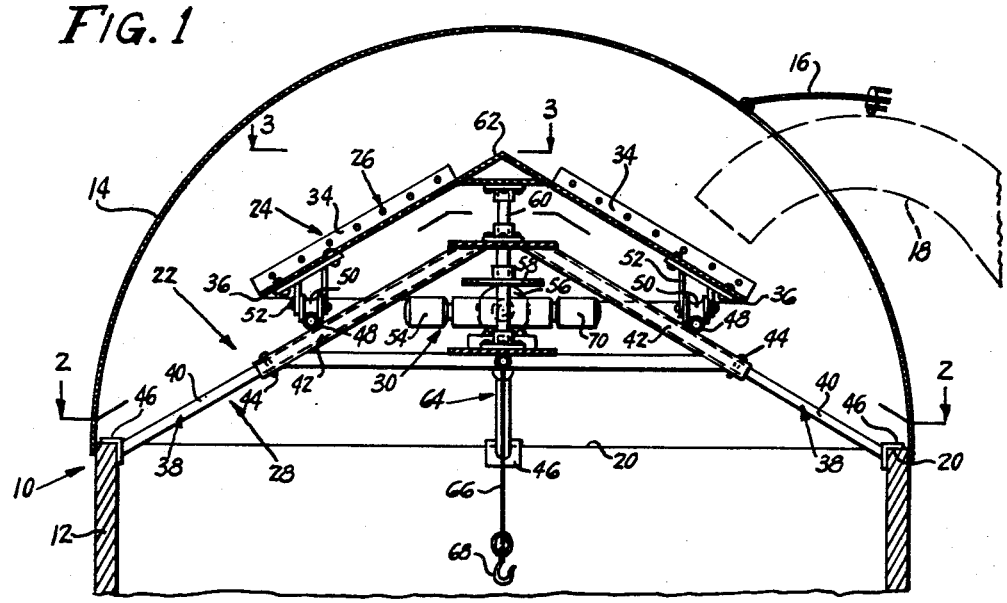

3,151,750
SILAGE DISTRIBUTOR
Francis E. Nold, 702 Jervis Ave., Rome, N.Y.
Filed June 7, 1963, Ser. No. 286,324
4 Claims. (Cl. 214—17)

This invention relates to a silage distributor and relates more particularly to a device for distributing ensilage within a silo to facilitate loading and unloading the same.

As conducive to a better understanding of the instant invention it should be pointed out that many serious problems arise from the conventional method of blowing or conveying material such as fodder, grain or the like into silos. The ensilage is normally carried through an opening in the top or roof of the silo by a conduit or pipe from a blower located on the ground. With conventional loading methods the lighter weight material is normally carried to the far side of the silo and the heavier material drops directly down from the end of the feeding means. The silo is thus subjected to uneven pressures and great difficulties are encountered for person or machine removing the material.

It is therefore a primary object of this invention to provide a device for distributing silage within a silo which is free from the foregoing and other disadvantages.

Another object of this invention is the provision of a silage distributor including a spreader or the like which may be readily placed immediately below the feeding means and which will efficiently distribute the material substantially uniformly throughout the silo.

A further object of the instant invention is the provision of a device of the character described having a spreader with a distributing surface and drive means operatively connected to rotate the surface beneath the feeding means, various distribution assistants such as openings or ribs being provided on the surface, although a smooth surface may be utilized.

A still further object of the instant invention is the provision of a silage distributor having adjustable supporting means to facilitate utilizing the same in silos of varying dimensions.

Yet another object of this invention is the provision of a device for distributing ensilage in a silo which has in combination therewith a winch means readily adapted for raising and lowering the silage unloader in a conventional manner.

Other and further objects reside in the combination of elements, arrangement of parts, and features of construction.

Still other objects will in part be obvious and in part be pointed out as the description of the invention proceeds and as shown in the accompanying drawing wherein:

FIGURE 1 is a fragmentary vertical cross sectional view through the upper portion of a silo showing the silage distributor of the instant invention mounted therein, with a portion of a feeding means being indicated in dotted lines;

FIGURE 2 is a fragmentary cross sectional view taken substantially on broken line 2—2 of FIGURE 1 and showing a portion of the means supporting the silage spreader in accordance with the instant inventive concept; and FIGURE 3 is a fragmentary top plan view taken substantially on line 3—3 of FIGURE 1 of the distributing surface of the silage spreader.

Like reference characters refer to like parts throughout the several views of the drawing.

Referring now to the drawing, the upper portion of a conventional silo is designated generally by the reference numeral 10 and includes a substantially cylindrical side wall 12 and a hemispherical roof or top portion 14 having a door or opening 16 for receiving a conduit or tube indicated at 18 in dotted lines forming part of a feeding means normally including a blower or the like (not shown). The top of the side wall 12 of the silo 10 defines a peripheral flange 20 to be utilized in supporting the device of the instant invention in a manner to be more fully described hereinafter.

A silage distributor in accordance with the instant inventive concept, is designated generally by the reference numeral 22 and comprises basically a silage spreader 24 having a distributing surface 26 thereon, supporting means 28 maintaining the spreader 24 substantially centrally of the silo 10 with at least a portion of the distributing surface 26 extending beneath the feeding means 18, and a drive means 30 operatively connected to the spreader 24 to rotate the surface 26 about a substantially vertical and central axis.

The distribution surface 26 of the silage spreader 24 may include a plurality of distribution aids to facilitate uniform spreading of the ensilage throughout the silo 10. For example, a plurality of radially and circumferentially spaced, preferably elongated, distribution openings 32 may be defined in the distributing surface 26. Also, a plurality of circumferentially spaced, radially extending, rib members 34 may be provided upstanding from the distributing surface 26. The silage spreader 24 may be provided in any desired form or configuration, a substantially conical element as shown being preferred. The elements of the spreader 24 may be formed of any conventional material, a plurality of individual segmental sections of sheet metal having upwardly bent radial side portions bolted to each other to form the rib members 34 being shown in the drawing and preferred. It has been found advantageous to have the edge or periphery 36 of the silage spreader 24 spaced from and above the inner walls of the silo in order to allow the material to slide off the spreader 24 into the body of the silo 10. These distribution aids will not always be necessary.

The supporting means 28 preferably includes a plurality of circumferentially spaced, radially extending leg members 38, four being shown as illustrative radiating outwardly from a connection plate. The leg members 38 are preferably made longitudinally adjustable such as by providing telescoping sections including a rod 40 slidably received in a sleeve 42 with any conventional means 44 for securing the adjustment. It will be readily understood that the rod and sleeve members may be reversed. End elements comprising angle members 46 are provided on the extremities of each leg member 38 and are dimensioned to be received by the peripheral flange 20 of the side wall 12 of the silo 10 to carry the silage distributor 22.

The supporting means 28 further includes a tubular substantially circular track member 48 secured to each of the leg members 38 in any conventional manner. A plurality of circumferentially spaced caster members 50 are rotatably supported by bracket 52 beneath the silage spreader 24 and are received in rolling relationship on the track member 48.

The drive means 30 may be of any conventional form and may include a motor 54 operatively connected in any conventional manner such as by bevel gears (not shown) or a pair of discs 56, 58 to a drive shaft 60 secured beneath the apex 62 or center of the silage spreader 24. A winch means 64 including a cable 66 and hook 68 depending into the silo 10 may be operatively connected to the motor 54 in any conventional manner such as by having a conventional clutch brake and drum assembly (not shown) connected to the cable 66 and drivingly secured to the motor 54, or an auxiliary motor 70 may be provided to operate the winch means 64 in any conventional manner.

The use and operation of the device of the instant invention will now be apparent. Each of the leg members 38 may be telescoped inwardly to facilitate positioning the silage distributor 22 within the silo 10 through an opening (not shown) either in the bottom or the top of the silo 10. The leg members 38 are then each extended until the angle elements 46 are received over the peripheral flange 20 of the side wall 12 of the silo 10 in supporting relationship. The drive means 30 may then be actuated from any remote source of electrical power (not shown) to rotate the silage spreader 24 beneath the feeding means 18 and thereby distribute the ensilage in a uniform manner. The distribution openings 32 are large enough to allow a portion of the material to fall therethrough as it slides down the conical distributing surface 26 and the upstanding rib members 34 assist in carrying ensilage away from the mouth of the feeding means 18 to facilitate distribution of the same to the opposite side of the silo 10. The winch means 64 may be readily used in a well known manner to raise and lower the conventional silage unloading machine (not shown).

It will now be seen that there is herein provided an improved silage distributor which satisfies all of the objectives of the instant invention and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense.

I claim:

1. A device for distributing silage delivered by a feeding means through the roof of a vertical cylindrical bodied silo comprising,
   a silage spreader including an upstanding rotatably supported conical silage distributing plate,
   supporting means entirely below said plate maintaining said spreader substantially centrally of the silo with at least a portion of said plate extending beneath the feeding means,
   said supporting means including, a connection plate beneath the vertex of said spreader, a plurality of downwardly and outwardly extending leg members radiating from said connection plate, the lower end of each leg including an angle member supportably contacting a top inner portion of the cylindrical silo, said angle member having a vertical plate and an outwardly directed horizontal plate,
   the space between the silage spreader and the silo roof being otherwise free of any structure to direct or control the movement of silage,
   and prime mover and drive means grouped below and near the axis of the conical distributing plate and operatively connected to said distributing plate to rotate it about a substantially vertical central axis.

2. A structure in accordance with claim 1 wherein each of said leg members is telescopically adjustable to accommodate silos of various dimensions.

3. A structure in accordance with claim 1 wherein said supporting means includes
   a substantially circular horizontal track means mounted on and above said leg members,
   and a plurality of circumferentially spaced caster members rotatably supported on and beneath said spreader, and radially positioned so as to be in rolling relationship with said track means.

4. A structure in accordance with claim 1 wherein,
   said spreader includes a plurality of concentric circular rows of narrow and radially long distributor openings defined in said plate except at the vertex portion of the cone which is constructed imperforate,
   said spreader also includes a plurality of circumferentially equally spaced radially extending constant height rib members upstanding from said plate from its peripheral edge to adjacent but stopping short of its vertex,
   the periphery of said plate being spaced an equal amount at all points above and within the top circular walls of the silo.

References Cited in the file of this patent

UNITED STATES PATENTS

| | | |
|---|---|---|
| 565,068 | Dornfeld | Aug. 4, 1896 |
| 2,655,273 | Snow | Oct. 13, 1953 |
| 2,721,665 | Goeke | Oct. 25, 1955 |
| 3,064,833 | Von Ruden | Nov. 20, 1962 |